US011509687B2

(12) United States Patent
Brandt et al.

(10) Patent No.: US 11,509,687 B2
(45) Date of Patent: Nov. 22, 2022

(54) DETECTION OF A MALICIOUS ENTITY WITHIN A NETWORK

(71) Applicant: The Western Union Company, Denver, CO (US)

(72) Inventors: Noel Brandt, Highlands Ranch, CO (US); Robert Enzaldo, Littleton, CO (US); Charles Champion, Lakewood, CO (US); Brent Lemieux, Broomfield, CO (US)

(73) Assignee: The Western Union Company, Denver, CO (US)

( * ) Notice: Subject to any disclaimer, the term of this patent is extended or adjusted under 35 U.S.C. 154(b) by 235 days.

(21) Appl. No.: 16/928,492

(22) Filed: Jul. 14, 2020

(65) Prior Publication Data

US 2021/0067524 A1 Mar. 4, 2021

Related U.S. Application Data

(60) Provisional application No. 62/891,536, filed on Aug. 26, 2019.

(51) Int. Cl.
*H04L 9/40* (2022.01)
*H04L 41/142* (2022.01)
(Continued)

(52) U.S. Cl.
CPC ........... *H04L 63/1466* (2013.01); *G06N 5/04* (2013.01); *G06N 20/00* (2019.01); *H04L 41/142* (2013.01);
(Continued)

(58) Field of Classification Search
CPC ...... G04L 63/1466; G06N 20/00; G06N 5/04; H04L 41/142; H04L 63/08; H04L 63/1416; H04L 63/20
(Continued)

(56) References Cited

U.S. PATENT DOCUMENTS 9,898,509 B2 2/2018 Saperstein et al.
2013/0133045 A1 5/2013 Hayes et al.
(Continued)

FOREIGN PATENT DOCUMENTS

| CA | 2737485 A1 | * | 4/2010 | ............. G01N 33/68 |
|----|------------|---|--------|---------------------|
| GB | 2581011 A | * | 8/2020 | ......... H04L 63/1425 |
| JP | 2019149681 A | * | 9/2019 | ......... G06F 16/9024 |

OTHER PUBLICATIONS

Zeadally et al., "Harnessing Artificial Intelligence Capabilities to Improve Cybersecurity," in IEEE Access, vol. 8, pp. 23817-23837, 2020, doi: 10.1109/ACCESS.2020.2968045. (Year: 2020).*

(Continued)

*Primary Examiner* — Peter C Shaw
(74) *Attorney, Agent, or Firm* — Kilpatrick Townsend & Stockton, LLP

(57) ABSTRACT

Techniques and systems for determining a malicious derivative entity within a network are provided herein. A method for determining a malicious derivative entity may include receiving, by a network-based authentication system, a plurality of network transactions. A first attribute of a network transaction within the plurality of network transactions may be identified. The method may also include identifying a plurality of entities for the first attribute. The network-based authentication system may generate a first visual representation of a relationship between the first attribute and the plurality of derivative entities. Each of the derivative entities and the first attribute may be represented as nodes within the first visual representation. A first score for each of the nodes may be determined based on a degree of centrality of the nodes within the first visual representation. One network transaction may be blocked based on at least one node exceeding a first threshold.

18 Claims, 6 Drawing Sheets

(51) Int. Cl.
*G06N 20/00* (2019.01)
*G06N 5/04* (2006.01)

(52) U.S. Cl.
CPC .......... *H04L 63/08* (2013.01); *H04L 63/1416* (2013.01); *H04L 63/20* (2013.01)

(58) Field of Classification Search
USPC ......................................................... 726/23
See application file for complete search history.

(56) References Cited

U.S. PATENT DOCUMENTS

| | | | |
|---|---|---|---|
| 2014/0189829 A1 | 7/2014 | McLachlan et al. | |
| 2018/0103052 A1* | 4/2018 | Choudhury | G06N 3/08 |
| 2018/0232835 A1* | 8/2018 | Gordon | G06Q 30/0627 |
| 2020/0195673 A1* | 6/2020 | Lee | H04L 45/70 |
| 2020/0244673 A1* | 7/2020 | Stockdale | H04L 63/1416 |

OTHER PUBLICATIONS

Hammoudeh et al., "Network Traffic Analysis for Threat Detection in the Internet of Things," in IEEE Internet of Things Magazine, vol. 3, No. 4, pp. 40-45, Dec. 2020, doi: 10.1109/IOTM.0001.2000015. (Year: 2020).*

Askoy et al., "Directional Laplacian Centrality for Cyber Situational Awareness,", arXiv.2008.04357, 2021, pp. 1-25. (Year: 2021).*

Mansmann et al., "Visual Analysis of Network Traffic for Resource Planning, Interactive Monitoring, and Interpretation of Security Threats," in IEEE Transactions on Visualization and Computer Graphics, vol. 13, No. 6, pp. 1105-1112, Nov.-Dec. 2007, doi: 10.1109/TVCG.2007.70522. (Year: 2007).*

Herland et al., "An Empirical Study of Robustness of Network Centrality Scores in Various Networks and Conditions," 2013 IEEE 25th International Conference on Tools with Artificial Intelligence, 2013, pp. 221-228, doi: 10.1109/ICTAI.2013.42. (Year: 2013).*

* cited by examiner

DETECTION OF A MALICIOUS ENTITY WITHIN A NETWORK

CROSS-REFERENCE TO RELATED APPLICATIONS

This application is a non-provisional of and claims priority to U.S. Provisional Patent Application No. 62/891,536, filed Aug. 26, 2019, which is hereby incorporated by reference herein.

BACKGROUND

Over the course of time network transactions have become more prevalent. For example, it is customary, at present time, for Person A to communicate with Person B via network transaction such as text message rather than face to face communication. However, network transactions may be less secure than in-person communications because, for example, it may not be possible to tell if Person A is really Person A and/or if Person A's network transaction is authorized. Furthermore, over the course of time, computer's computational abilities have also become more prevalent. As a result, a voluminous amount of network transactions may be processed in a relatively short period of time. For example, 1,700 network transactions may be processed per second. With such a vast amount of network transactions being processed, malicious network transactions and bad actors may be hard to detect in real-time. Thus, although technological advancements have made network transactions more popular, these advancements also make these network transactions subject to various security concerns (e.g., malicious network transactions, unauthorized network transactions, illegal network transactions (anti-money laundering), and the like). Embodiments of this disclosure aim to determine whether a network transition is malicious and/or whether one or more entities associated with a network transaction are in compliance with rules that govern network transactions within a network-based authentication system.

SUMMARY

Techniques disclosed herein described systems, non-transitory computer-readable mediums, and methods for managing rules for a network-based authentication system. Specifically, the techniques described herein may determine a malicious derivative entity within a network. A method may include receiving, by a network-based authentication system, a plurality of network transactions. The network-based authentication system may identify a first attribute of a network transaction within the plurality of network transactions. For example, a first attribute may include a sender identifier, a receiver identifier, a system administrator identifier, and a location. The network-based authentication system may identify a plurality of derivative entities for the first attribute. In some embodiments, the network-based authentication system may identify the plurality of derivative entities for the first attribute by determining a first entity that has at least one relation to the first attribute and determining a second entity that has at least one relation to the first entity. The plurality of derivative entities may include the first entity and the second entity.

The network-based authentication system may identify a first visual representation of a relationship between the first attribute and the plurality of derivate entities. Each of the derivative entities and the first attribute may be represented as nodes within the first visual representation. The network-based authentication system may determine a first score for each of the nodes within the first visual representation based on a degree of centrality of the nodes within the first visual representation. In some embodiments, the method may include calculating the degree of centrality for each of the nodes within the first visual representation. The degree of centrality corresponds to a number of edges attached to each node. The network-based authentication system may determine at least one node that exceeds a first threshold based on the first score. The at least one node is representative of one of the plurality of derivative entities. Based on the at least one node exceeding the first threshold, the network-based authentication system may block one network transaction within the plurality of network transactions. In some embodiments, the network-based authentication system may block an entity from participating in future network transactions of the network-based authentication system based on the at least one node exceeding the first threshold.

In some embodiments, the method may further include determining, by the network-based authentication system, a machine learning model. The machine learning model may determine a first individual score for each of the nodes within the first visual representation. The network-based authentication system may update the first score for each of the nodes within the first visual representation to generate a second updated score for each of the nodes. In various embodiments, updating the first score for each of the nodes within the first visual representation may include comparing, by the network-based authentication system, the first individual score for each of the nodes to a threshold. The network-based authentication system may remove one or more nodes that have first individual scores that exceed the threshold from the first visual representation.

A network-based authentication system is also described herein. The network-based authentication system may include one or more processing units, each processing unit including one or more processors. The network-based authentication system may also include one or more memory devices respectively coupled to and readable by the one or more processing units. The memory devices may store one or more sets of instructions which, when executed by the processing units cause one or more processors to receive a plurality of network transactions. The instructions may also cause the one or more processors to identify a first attribute of a network transaction within the plurality of network transactions. For example, a first attribute may include a sender identifier, a receiver identifier, a system administrator identifier, and a location. A plurality of derivative entities may be identified for the first attribute. For example, the one or more processors may determine a first entity that has at least one relation to the first attribute and determine a second entity that has at least one relation to the first entity. The plurality of derivative entities may include the first entity and the second entity.

The instructions may also cause the one or more processors to generate a first visual representation of a relationship between the first attribute and the plurality of derivate entities. Each of the plurality derivative entities and the first attribute may be represented as nodes within the first visual representation. A first score for each of the nodes within the first visual representation may be determined based on a degree of centrality of the nodes within the first visual representation. In some embodiments, the instructions may cause the one or more processors to calculate the degree of centrality for each of the nodes within the first visual representation. The degree of centrality may correspond to a number of edges attached to each node.

The instructions may further cause the one or more processors to determine at least one node that exceeds a first threshold based on the first scores. The at least one node may be representative of one of the plurality of derivative entities. Based on the at least one node that exceeds the first threshold, one network transaction within the plurality of network transactions may be blocked. In some embodiments, the one or more processors may take remedial action against the at least one node that exceeds the first threshold. The at least one node is an entity and the remedial action may include blocking the entity from participating in future network transactions within the network-based authentication system.

In some embodiments, the instructions may further cause the one or more processors to determine a machine learning model. The machine learning model may determine a first individual score for each of the nodes within the first visual representation. The first score for each of the nodes within the first visual representation may be updated to generate a second updated score for each of the nodes. In various embodiments, the instructions may further cause the one or more processors to compare the first individual score for each of the nodes to a threshold and remove one or more nodes that have first individual scores that exceed the threshold from the first visual representation.

In an aspect, a non-transitory computer-readable medium having stored thereon a series of instructions which, when executed by one or more processors of a network-based authentication system, cause the one or more processors to determine a malicious derivative entity within a network is also provided herein. The one or more processors may determine malicious derivative entity within a network by receiving a plurality of network transactions. A first attribute of a network transaction within the plurality of network transactions may be identified. A plurality of derivative entities for the first attribute may be identified. For example, the instructions may cause the one or more processors to determine a first entity that has at least one relation to the first attribute and determine a second entity that has at least one relation to the first entity. The plurality of derivative entities may include the first entity and the second entity.

The instructions may further cause the one or more processors to determine the malicious derivative entity within the network by generating a first visual representation of a relationship between the first attribute and the plurality of derivate entities. Each of the derivative entities and the first attribute may be represented as nodes within the first visual representation. A first score for each of the nodes within the first visual representation may be determined based on a degree of centrality of the nodes within the first visual representation. For example, the one or more processors may calculate the degree of centrality for each of the nodes within the first visual representation. The degree of centrality may correspond to a number of edges attached to each node.

One network transaction within the plurality of network transactions may be blocked based on the at least one node that exceeds the first threshold. In some embodiments, the instructions may cause the one or more processors to take remedial action against the at least one node that exceeds the first threshold. The at least one node is an entity and the remedial action may include blocking the entity from participating in future network transactions within the network-based authentication system.

In some embodiments, the instructions may further cause the one or more processors to determine the malicious derivative entity within the network by determining a machine learning model. The machine learning model may determine a first individual score for each of the nodes within the first visual representation. The first score for each of the nodes within the first visual representation may be updated to generate a second updated score for each of the nodes. In some aspects, the one or more processors may further compare the first individual score to each of the nodes to a threshold and remove one or more nodes that have first individual scores that exceed the threshold from the first visual representation.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
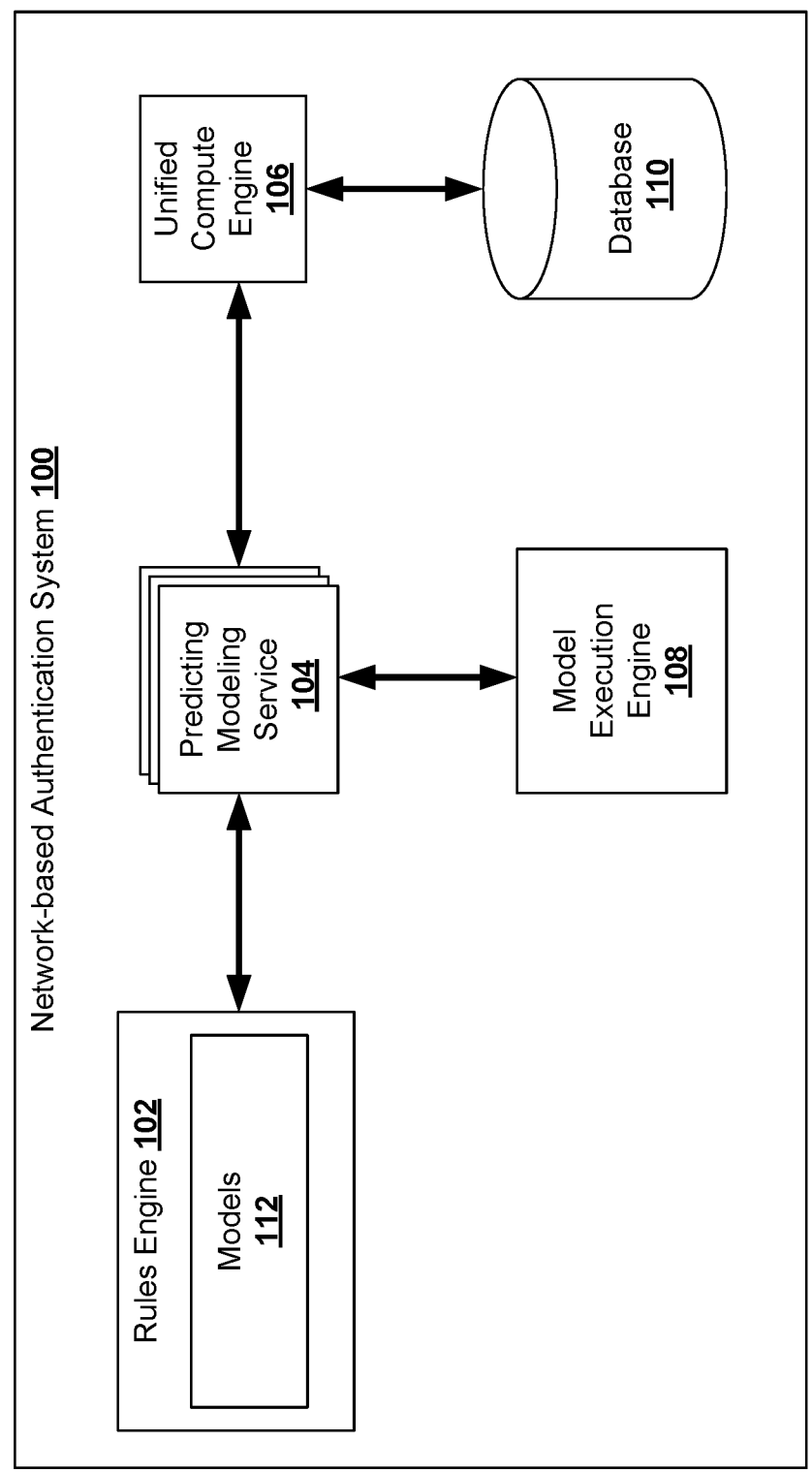
FIG. 1 illustrates a network-based authentication system in accordance with one or more embodiments described herein.

Embodiments disclosed herein relate generally to techniques and systems for detecting malicious activity within a network. For example, the systems and methods disclosed herein relate to detecting whether (a) a network transaction is unauthorized, (b) an entity associated with the network transaction is compromised or authorized to partake or assist in the network transaction, or (c) if any derivatives of (a) or (b) are malicious. More specifically, embodiments described herein disclose systems and processes for detecting a malicious network transaction based on a first attribute of the network transaction, such as the sender or the recipient of the network transaction.

Due to the voluminous amount of network transactions, such as electronic communications, that may be processed by a network-based authentication system there is a need to determine in real-time if a network transaction is malicious and should be authorized by the network-based authentication system. In current network-based authentication systems, authorization rules (e.g., fraud rules) may be governed by static rules that are based on network transaction attributes or data associated with an entity associated with the network transaction (e.g., sender, receiver, system administrator, and the like). However, due to sophistication of bad actors, static rules may not be modified fast enough to detect new advances by bad actors (e.g., new patterns of unauthorized network transactions). In response to the sophistication of bad actors, embodiments described herein may implement one or more self/assisted learning statistical model that will allow for real-time analysis of network transactions and dynamic evaluation of network transactions for malicious activity.

Techniques and systems described herein are an improvement to network-based authentication system technology.

For example, the techniques and systems herein can be used to improve network-based authentication systems. In other embodiments, the techniques described herein may be used for network security compliance or improving network transaction security. For example, the techniques may improve network security for transmission of data packets, networking, data transmission, access control lists/rules for firewalls, or other proxy applications in which transmission of certain activity/data is permissible while transmission of other activity/data is impermissible and identified to be prevented.

The techniques and systems described herein may provide for reduced manual intervention and improved authorization speed for network transactions within a network-based authentication system. For example, the techniques and systems herein may allow for real-time analysis of network transaction for malicious activity, including automatic data collection, modeling, analysis, and authorization recommendations. Real-time processing afforded by the instant systems and methods may also allow for real-time authentication of network transactions to keep up with the dynamic nature of fraudulent activity. Additionally, the techniques and systems herein may improve accuracy of network-based authentication systems. Finally, the techniques and systems herein may provide for easy tenability and upgrading of network-based authentication systems. For example, in some embodiments, the network-based authentication system herein may have minimal parameters to adjust, allowing for easy manipulation of metrics to evaluate a network transaction for malicious activity.

FIG. 1 illustrates a network-based authentication system 100 in accordance with one or more embodiments described herein. Network-based authentication system 100 may process and authentication network-based transactions before completion. Network-based authentication system 100 may include one or more processors and one or more sets of memory, such as non-volatile memories. The processor(s) may include single or multicore processors. The processors may operate under the control of software stored in the associated one or more sets of memory. The one or more sets of memory may store instructions, that when executed by the one or more processors cause network-based authentication system 100 to perform one or more functions described herein. In one embodiment, network-based authentication system 100 may be implemented as an application server.

Network-based authentication system 100 may include a rules engine 102, a predicting modeling service 104, a unified compute engine 106, a database 108, and a model execution engine 110. Rule engine 102 may receive a network transaction (e.g., real-time network transaction) and determine one or more applicable learning statistical models to evaluate the network transaction. A learning statistical model may be a predictive model that uses one or more machine learning techniques to determine if a particular network transaction is fraudulent or malicious. A learning statistical model may evaluate whether a network transaction is malicious (e.g., unauthorized) based on one or more attributes of the network transaction.

The rule engine 102 may select one or more applicable learning statistical models 112 to apply to a network transaction. In some embodiments, one or more learning statistical models 112 may be part of the rule engine 102 and/or the network-based authentication system 100. However, in other embodiments, the one or more learning statistical models 112 may be stored or held remote from the rule engine 102 and/or the network-based authentication system 100. Selection of an applicable learning statistical model may be based on one or more attributes of the network transaction. For example, an applicable learning statistical model may be selected based on the number of recipients, the sender or recipient location, the type of network transaction, the content of the network transaction, or any other attribute of the network transaction. In some embodiments, selection of the one or more learning statistical models 112 may be based on a pre-defined preference or past related network transactions. In one embodiment, a combination of (e.g., two or more) learning statistical models 112 may be utilized based on the characteristics of the network transaction. In such an embodiment, a first learning statistical model may be selected based on one attribute, such as for example the sender, of a network transaction and a second learning statistical model may be selected based on a second attribute, such as for example the destination, of the network transaction. In some embodiments, more than one learning statistical model may be selected based on the same attribute(s).

Once one or more applicable learning statistical models 112 have been determined, the rule engine 102 may request a model score associated with each of the one or more applicable learning statistical models 112 from the predictive modeling service 104. In some embodiments, the predictive modeling service 104 may be part of the network-based authentication system 100, as shown in FIG. 1, while in other embodiments, the predictive modeling service 104 may be remote to the network-based authentication system 100.

The predictive modeling service 104 may determine modeling scores for each of the one or more learning statistical models 112 based on the network transaction. A model score determined by the learning statistical model may be based upon scoring one or more factors associated with attributes of a network transaction. For example, one or more attributes of the network transaction may receive a factor score. The model score for a given network transaction may then be calculated based on each factor score of the one or more attributes of the network transaction. For example, the learning statistical model may determine a factor score of a 2% probability that the network transaction is unauthorized based on the sender of the network transaction. The learning statistical model may further determine a factor score of a 5% probability that the network transaction is unauthorized based on the value associated with the network transaction. However, the learning statistical model may further determine a factor score of a 40% probability that the network transaction is unauthorized based on the country associated with the network transaction. Each of these factor scores may be averaged together form an overall probability of 15% that the network transaction is unauthorized. In other embodiments, the factor scores may be cumulative or weighted to produce an overall probability of malicious activity.

As noted above, in some embodiments a combination of learning statistical models 112 may be used. In such cases, each learning statistical model may use different factor scores to determine the likelihood that the network transaction is authorized or unauthorized. By utilizing a plurality of models, network transaction authorization may be more accurately determined than relying a one-size-fits-all model.

The learning statistical model may be trained based on past indications of unauthorized network transactions and attributes associated with the unauthorized network transaction. Attributes of a network transaction may include a plurality of factors, such as, but not limited to attributes associated with an identification of sender or receiver of a network transaction, identification of an agent assisting a sender or receiver of a network transaction, a location that is the source or destination of a network transaction, a location associated with a network transaction, a value of the network transaction, a type of the network transaction, and the like. A location as used herein may include any identifiable distinction between geographic areas, such as a continent, country, region (e.g., the Midwest), state, county, city, zip code, or the like. In some cases, the attribute may be identified by the network-based authentication system 100 using an identifier, for example a sender identifier, a recipient identifier, a system administrator identifier, and the like. A learning statistical model may utilize one or more aggregation algorithms such as distinct count, summation, averages, standard deviation, Z-scores, minimums, maximums, ranges, and the like to determine a score in order to determine unauthorized network transaction in real-time.

Once the factors associated with the attribute are identified, the predictive modeling service 104 may request those factors from the unified compute engine 106. The unified compute engine 106 may include a set of logic capable of returning model factor data, such as aggregation, summaries, or other basic mathematical operations to support the inputs required of a model. In some embodiments, the unified compute engine 106 may transform raw data into a form that can be ingested into a model. The unified compute engine 106 may then retrieve the factors from the database 108. In one embodiment, the retrieved factors may be precomputed factors. The precomputed factors may be computed previously or offline. These precomputed factors may be computed any time prior to being retrieved (e.g., 1 day ago, 6 hours ago, etc.). The precomputed factors may be factors that may require a vast amount of data. For example, a precomputed factor may be the average rate of suspicious activity for a location over a 6 month period. Clearly, such a factor may include a vast amount of data and could not be determined in real-time as a network transaction is received. Conversely, a real-time factor may be the sum of the values of network transactions associated with a particular sender. Such a factor may not require a vast amount of data and thus may be computed in real-time or near real-time as a network transaction is received.

In one embodiment, the one or more learning statistical models 112 may utilize past network transactions. Past network transactions may be determined based on a validity period. The past network transactions may correspond to an attribute. For example, a validity period of 12 months may be used to determine past network transactions associated with a first attribute. In such an example, the unified compute engine 106 may retrieve factors associated with past network transactions occurring only within the 12 month validity period. In other words, when determining the probability that the network transaction is malicious, the network-based authentication system 100 may only consider network transactions within the last 12 months. In some embodiments, there may be different validity periods for different attributes. For example, a validity period of 2 months associated with countries associated with past network transactions. In such an embodiment, the network-based authentication system executing the learning statistical model may retrieve one or more past network transactions that are associated with the identified country. When determining the probability that the current transaction is unauthorized based on an associated country, the machine learning model may only consider network transactions within the last 2 months. As a result, different attributes of data input into the learning statistical model may have a variety of validity periods and not just one validity period, as is the case in many current systems.

The unified compute engine 106 may also retrieve or determine real-time factor values in addition to the precomputed factor values based on the attributes of the network transaction. A real-time factor value may merely be an indication of a related data set that may not involve a precomputation. For example, the real-time factor value of the total sum of values of previous network transactions associated with sender of a network transaction may include a value associated with previous network transactions and the sum of those values may be dynamically determined instead of precomputed.

After the real-time and/or precomputed factor values have been retrieved or determined, the unified compute engine 206 may then transmit both the precomputed factor values and the real-time factor values to the predictive modeling service 104. The predictive modeling service 104 may then transmit the real-time factor values and/or the precomputed factor values to the model execution engine 110. The model execution engine 110 may execute the one or more learning statistical models 112 based on the real-time and/or precomputed factor values. For example, a first learning statistical model may be utilized to determine if a network transaction is authorized based on source location A. In order to make this determination, the first learning statistical model may need the precomputed factor score for the average rate of suspicious activity over the last 6 months where location A is the source. Utilizing that precomputed factor, the first learning statistical model may produce a first model score that indicates the likelihood (e.g., probability), according to that model, that a network transaction is unauthorized. In the same example, a second learning statistical model may be utilized to determine if the network transaction is authorized based on the total value of network transactions associated with a sender of the network transaction in question. In order to make this determination, the second learning statistical model may retrieve real-time factor of the value of previously transmitted network transactions associated with the sender over the past month. Utilizing that real-time factor, the second learning statistical model may produce a second model score that indicates the likelihood, according to the second learning statistical model, that the network transaction is unauthorized.

After one or more model scores have been produced from the one or more learning statistical models 112, the network-based authorization system 100 may then determine whether to authorize the network transaction. To determine whether to authorize the network transaction, each model score may be compared to a threshold. In embodiments where there is more than one model score, each model score may be compared to a different threshold. For example, a first model score may be compared to a first threshold and a second model score may be compared to a second threshold. In other embodiments, each model score may be compared to the same threshold. In some embodiments, each model score from the one or more learning statistical models 112 may be combined, for example averaged, to determine an overall model score for the network transaction. In such cases, the overall model score may be compared to the threshold to determine whether the network transaction is malicious.

When a model score is below a threshold, the network-based authentication system 100 may determine that the network transaction is not malicious and may authorize the network transaction. If a model score is at or above the threshold, network-based authentication system 100 may not authorize the network transaction. In some embodiments, if the model score is at or above the threshold, network-based authentication system 100 may take various remedial actions against the network transaction. For example, the network-based authentication system 100 may block the network transaction or may alert a third-party (i.e. a bank, government authority, and the like).

In some instances it may be helpful to authorize the network transaction even if its model score exceeds the threshold. For example, this may occur in order to track the receiver of the network transaction and the receiver's subsequent actions after receiving the network transaction. By blocking an unauthorized network transaction it may alert a potentially fraudulent sender or receiver, which may not always be a desired solution.

In summary, by combining different learning models and different precomputed and real-time factors a more accurate determination of the malicious nature of a network transaction may be reached. By using precomputed factors, factors that involve a vast amount of data may be precomputed in order to save processing time and processing resources. On the other hand, by using real-time factors, factors that do not involve a vast amount of data may be calculated when a network transaction is received so that a determination is based on the most recent information. By saving some computations to be performed in real-time, memory resources within the system may be saved and utilized for precomputed factors based on larger data sets.

In some embodiments, the network-based authentication system 100 may include hardware and software components for storing data and program instructions, such as one or more processors, one or more sets of memory, such as non-volatile memories, and one or more computer-readable storage media. The one or more memory and/or computer readable storage media may store program instructions that are loadable and executable by the one or more processors. The processor(s) may include single or multicore processors. The processors may operate under the control of software stored in the associated one or more sets of memory. The one or more sets of memory may store instructions, that when executed by the one or more processors cause the network-based authentication system 100 to perform one or more functions described herein. In one embodiment, the network-based authentication system 100 may be implemented as an application server.

Depending on the configuration and type of processor(s), the one or more memory of the network-based authentication system 100 may be stored in volatile memory (such as random access memory (RAM), and/or in non-volatile storage drives, such as read-only memory (ROM, flash memory, etc.). In some cases, the one or more memory may contain data and/or program modules that are immediately accessible to and/or presently being operated and executed by the one or more processors of the network-based authentication system 100. In some implementation, the one or more memory may include multiple different types of memory, such as static random access memory (SRAM) or dynamic random access memory (DRAM). In some implementations, a basic input/output system, (BIOS), containing the basic routines that help to transfer information between elements within the network-based authentication system 100, such as during start-up, may typically be stored in non-volatile storage drives. By way of example, and not limitation, the one or more memory of the network-based authentication system 100 may include application programs, such as server applications or operating systems.

Network-based authentication system 100 may also include computer-readable storage media. The computer-readable storage media may contain program code, or portions of program code, and may include any appropriate media known or used in the art, including storage media and communication media, such as but not limited to, volatile and non-volatile, removable and non-removable media implemented in any method or technology for storage and/or transmission of information. This can include tangible computer-readable storage media, such as RAM, ROM, electronically erasable programmable ROM (EEPROM), flash memory or other memory technology, CD ROM, digital versatile disk (DVD), or other optical storage, magnetic cassettes, magnetic tapes, magnetic disk storage or other magnetic storage devices, or other tangible computer readable media, such as data signals, data transmission, or any other medium which can be used to transmit the desired information and which can be accessed by network-based authentication system 100 or the one or more processors of network-based authentication system 100.

By way of example, the computer-readable storage media may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media may include, but is not limited to, Zip® drives, flash memory cards, universal serial bus (USB) flash drives, secure digital (SD) cards, DVD disks, digital video tape, and the like. Computer-readable storage media may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for network-based authentication system 100.

In some cases, network-based authentication system 100 may include one or more communications subsystems for providing a communication interface from network-based authentication system 100 and external computing devices via one or more communication networks, including local area networks (LANs), wide area networks (WANs) (e.g., the Internet), and various wireless telecommunications networks. The communications subsystem may include, for example, one or more network interface controllers (NICs), such as Ethernet cards, Asynchronous Transfer Mode NICs, Token Ring NICs, and the like, as well as one or more wireless communications interfaces, such as wireless network interface controllers (WNICs), wireless network adapters, and the like. Additionally and/or alternatively, the communications subsystem may include one or more modems (telephone, satellite, cable, ISDN), synchronous or asynchronous digital subscriber line (DSL) units, FireWire® interfaces, USB® interfaces, and the like. In some cases, the communications subsystem also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem may be detachable components coupled to network-based authentication system 100 via a computer network, a FireWire® bus, or the like, and/or may be physically integrated into network-based authentication system 100. In some cases, the communications subsystem also may be implemented in whole or in part by software.

In some embodiments, the communications subsystem may also receive input communication in the form of structured and/or unstructured data feeds, event streams, event updates, and the like, on behalf of one or more users who may use or access network-based authentication system 100. In some cases, communications subsystem may be configured to receive data in the form of continuous data streams, which may include event streams of real-time events and/or event updates (e.g., sensor data applications, financial tickers, network performance measuring tools, clickstream analysis tools, etc.). The communications subsystem may output such structured and/or unstructured data feeds, event streams, event updates, and the like to one or more data stores that may be in communication with one or more streaming data source computers coupled to network-based authentication system 100.

Due to the ever-changing nature of computers and networks, the description of network-based authentication system 100 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 2:
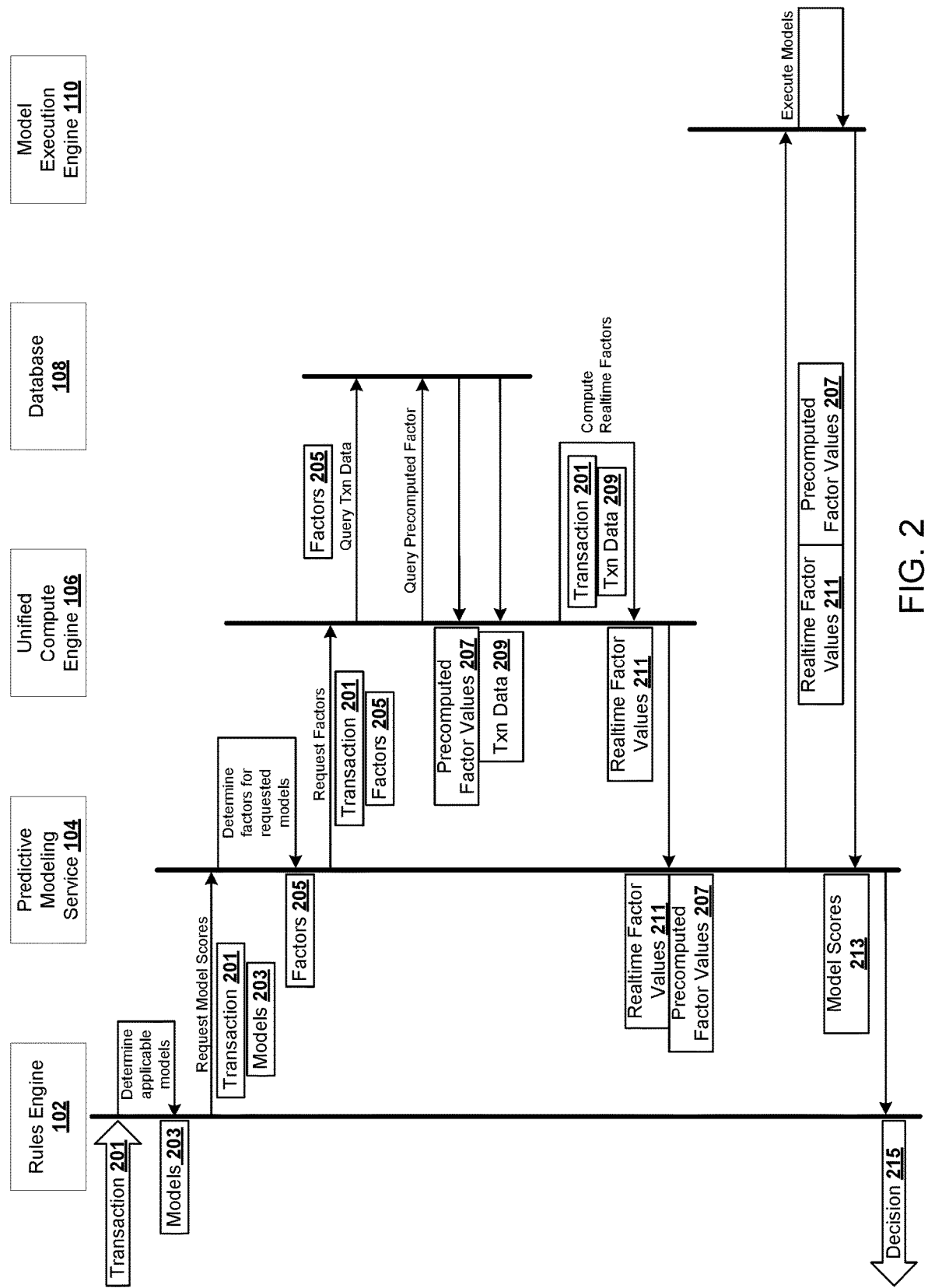
FIG. 2 illustrates a swim-lane diagram of the one or more functions performable by the network-based authentication system.

FIG. 2 illustrates a swim-lane diagram of the one or more functions performable by the network-based authentication system 100. In some embodiments, FIG. 2 may represent a machine learning model implemented by the network-based authentication system 100. As shown on FIG. 2, a network-based authentication system, such as the network-based authentication system 100, may receive a network transaction 201. The network transaction 201 may be received by the rule engine 102. Rule engine 102 may determine a machine learning model. The machine learning model may include one or more learning statistical models 203. The one or more learning statistical models 203 may be the same as models 112. Rule engine 102 may determine one or more learning statistical models 203 that are applicable to the network transaction 201.

After the one or more learning statistical models 203 are determined, the rule engine 102 may request model scores for each of the models 203. The request may be made to the predictive modeling service 104. The predictive modeling service 104 may determine what factors 205 are required for each of the learning statistical models 203. Once predictive modeling service 104 identifies factors 205, predictive modeling service 104 may request factor values based on factors 205 from unified compute engine 106. Factor values may include real-time factors and/or precomputed factors. Real-time factors may be factors associated with a network transaction that occur or are identified at the time or within a period of time close to when the network transaction is received by the network-based authentication system. In contrast, precomputed factors may include factors that have been previously gathered and stored by the network-based authentication system. Precomputed factors may correspond to previous network transactions processed by the network-based authentication system. In some cases, precomputed factors may be factors that the network-based authentication calculated based on previous network transactions.

Unified compute engine 106 may query database 108 for precomputed factor values 207 based on factors 205. Unified compute engine 106 may also query database 108 for additional data associated with the network transaction 201. In some embodiments, the additional transaction data 209 may include system administrator location or destination location associated with the network transaction. For example, the network transaction 201 may explicitly identify a sender and a recipient. Attributes corresponding to the sender and the recipient (e.g., locations) may be determined by querying database 108 to identify a location associated with the recipient, for example a home address stored in database 108.

Database 108 may return precomputed factor values 207 and transaction data 209 to unified compute engine 106. Using the transaction data 209, the unified compute engine 106 may compute or determine real-time factor values 211. Predictive modeling service 104 may receive the real-time factor values 211 and precomputed factor values 207 from the unified compute engine 106. Predictive modeling service 104 may request model execution engine 110 to execute the one or more learning statistical models 203 using the real-time factor values 211 and the precomputed factor values 207. Model execution engine 110 may return a model score 213 for each of the one or more learning statistical models 203 after execution. The model scores 213 may be returned to the predictive modeling service 104. The predictive modeling service 104 may share the model scores 213 the rule engine 102. Based on the model scores 213, the rule engine 102 may render a decision 215 on whether the network transaction 201 is malicious and/or whether to authorize the network transaction 201. The rule engine 102 may render or determine decision 215 according to the methods described herein.

One or more network transactions may need to invoke user assistance in order to process. For example, if a network transaction is significant (e.g., large monetary value associated with the network transaction) or sensitive in nature, it may need a user such as a system administrator to aid in processing the network transaction. In such an example, a system administrator's authorization may be needed to authenticate a network transaction that is above a threshold size or certain sensitivity level. During this process, the network transaction itself may be subject to real-time threat assessments (as described above), but in traditional systems, the system administrator may not be subject to threat assessments. This may result in the system administrator himself or herself being a bad actor and maliciously modifying the network transaction or the real-time threat assessment system to circumvent the real-time threat assessment (e.g., authenticating a flagged network transaction). Furthermore, in mass communication systems there may be hundreds, thousands, or tens of thousands system administrators. As a result, there is a need to develop a system that may automatically monitor system administrators and locations of system of administrators to determine when there is potentially malicious activity (e.g. determine agent or agent location compliance).

Prior systems of monitoring system administrators and/or system administrator locations utilize standard deviation measurements to subjectively compare and rank system administrators and system administrator locations. For example a first system administrator would be ranked (as far as probability of malicious activity) in direct comparison to a second system administrator or one or more system administrators. However, such a traditional system does not accurately determine if a system administrator is in fact committing malicious activity, but instead only determines, relatively, if a system administrator is more likely to be committing malicious activity than another. Such a system is highly inaccurate as various factors may modify a standard deviation of a system administrator, but such factors may not indicate malicious activity. For example, if the average size of a network transaction associated with an average system administrator is 5, but a first system administrator is associated with network transactions with an average size of 9, this may cause a standard deviation of 4 from the average system administrator. According to traditional systems, this may indicate that the first system administrator is more likely to be malicious than the average system administrator at least when it comes to network transaction size. However, reasonable explanations for the deviation may exist such that the first system administrator handles international network transactions which may be bigger than regular network transactions. Thus, using standard deviation techniques may inaccurately peg system administrators as being malicious when they are not.

By its application of machine learning tools such as a learning statistical model, embodiments disclosed herein allow for more accurate malicious activity detection of system administrators and system administrator locations. Such detection may be forwarded to a third-party for subsequent remedial action. In other embodiments, such detection may automatically cause one or more remedial actions such as preventing a system administrator from being involved with subsequent network transactions, or preventing network transactions from being associated with any system administrator at a particular system administrator location. Utilizing machine learning tools may also eliminate the need for subjective or human determination, at least initially, of malicious activity of a system administrator.

In some embodiments, a network-based authentication system, such as network-based authentication system 100, may host, train and execute a machine learning model to determine if a system administrator or system administrator location is potentially malicious. The machine learning model may be trained by historical risk factors that are matched with completed malicious detections in order to predict the likelihood of high risk or very high risk system administrators and/or system administrator locations. For example, risk factors may include a value or type of network transaction associated with a system administrator over a certain period of time, a frequency of network transactions associated with a system administrator, source and destinations of network transactions associated with a system administrator, log-in patterns associated with system administrators, a number of system administrators at a system administrator location, Global Positioning System (GPS) based location of system administrator location, and the like. Particular thresholds associated with risk factors may be established by the machine learning model based on risk factors that were determined in instances where malicious activity was found to be performed by a system administrator or at a system administrator location. For example, if it was previously determined that a malicious system administrator averaged 10 network transactions 30 minutes before logging off his machine this data may be used to train the machine learning model such that a similar behavior may indicate malicious activity.

Because there is a plethora of risk factors that may be derived from prior confirmed malicious activity, the machine learning model may be implemented by a random forest-based prediction model. In random forest classification, a network-based authentication system may utilize a plurality of different decision trees where each decision tree is trained based on different risk factors to determine if a system administrator or a system administrator location is suspected of malicious activity. For example a first decision tree may determine malicious activity based on the risk factors of size of network transactions and/or log-in time of system administrators. A second decision tree may determine malicious activity based on the risk factors of source and/or destination of network transactions. A third decision tree may determine malicious activity based on the risk factor of log-in patterns of a system administrator and/or remote access patterns of a system administrator. By training each decision tree based on different risk factors, the total votes from each decision tree (e.g. the number of decision trees that indicate malicious activity) may represent an accurate overall determination.

It is important to note that all described techniques may be applied to a system administrator location. In some instances, one or more system administrators individually may not represent a likelihood of malicious activity but their combined actions may indicate that a system administrator location may be malicious. As a result, it may be beneficial to remotely disable all access to the network-based authentication system for system administrators associated with a particular system administrator location while an investigation is done. Disabling a system administrator location (e.g., an agent office, a bank branch, and the like) may be particularly helpful if it is not possible to exactly pin down a specific bad actor at a location, but it is indicated that some type of malicious activity is occurring at that location. Disablement may also be helpful when malicious activity is covertly split between two or more system administrators at a location in an attempt to avoid detection.

Although the above description of a machine learning model relates to detecting malicious activity of system administrators, it should be understood that the above description of the machine learning model and techniques may apply to any attribute associated with a network transaction.

Regardless of the methodology utilized to determine if a network transaction, entities associated with the current network transaction, system administrators associated with the network transaction, and/or system locations associated with the network transaction are malicious and/or should be authorized, it may be useful to determine if one or more derivate entities is also malicious. A derivate entity may be a sender, receiver, system administrator, system administrator location, and the like that has one or more relations to a network transaction and/or any attribute of the network transaction, such as for example a sender, a receiver, a system administrator, and/or a system administrator location. For example, a first network transaction may be between sender A and receiver B. Subsequently, a current network transaction may be between receiver B and receiver C. As a result, sender A may be a derivate entity of the current network transaction based at least in part because of his previous interactions with receiver B.

Utilizing embodiments described herein, a visual representation of connections between different derivate entities may be recognized utilizing network analytics. Network analytics involve viewing entities and derivative entities not only by their own attributes, but how they related to their neighbors. Being able to calculate these analytics and use them to determine unauthorized or malicious activities gives unique insight into many areas such as: risk scoring, customer segmentation, transactional flow, and entity matching.

To implement graph algorithms to create a visual representation, a network-based authentication system, such as network-based authentication system 100, may retrieve a plurality of filtered network transactions from storage (e.g., from an electronic database containing a plurality of past network transactions such as database 108). The filtered network transactions may be filtered based on one more attributes such as a common source, common destination, common system administrator, common system administrator location, common value, and the like. Each node in the visual representation may represent an entity. In such an instance, an entity may comprise an identification of one or more of: a network transaction, a sender, a receiver, a system administrator, a system administrator location, network transaction location (e.g., sending or destination), and the like.

Figure 3:
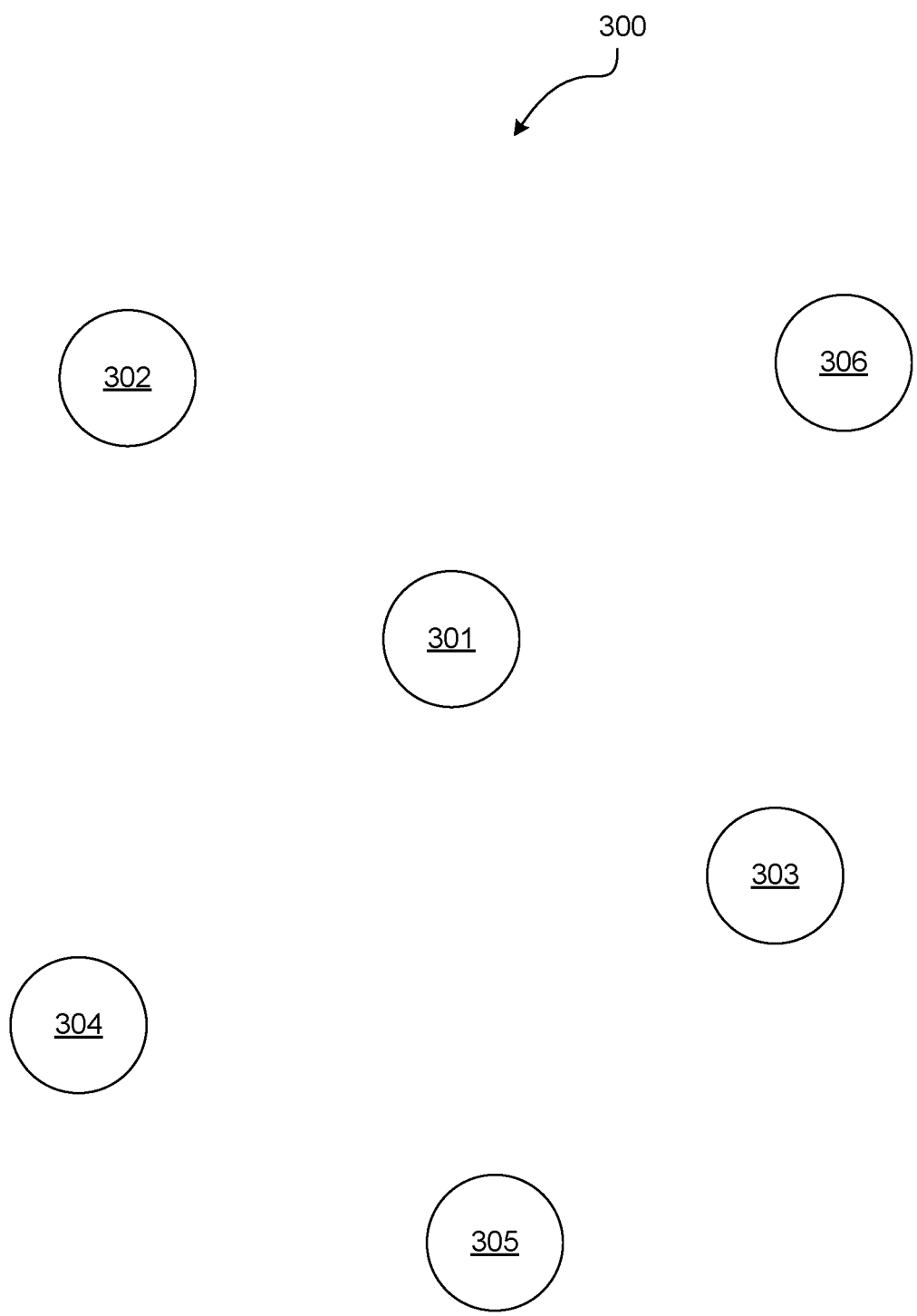
FIG. 3 provides a first visual representation generated by the network-based authentication system.

FIG. 3 provides an example of a visual representation. FIG. 3 illustrates graph 300 comprising nodes 301-306. Each of nodes 301-306 in graph 300 may represent receivers in a certain region. For example, nodes 301-306 may represent receivers of network transactions over the last 2 months in Kansas City, Mo. In another example, nodes 301-306 may represent receivers of network transactions associated with a first system administrator or system administrator location. In various embodiments, nodes 301-306 may represent any attribute associated with the network transaction. Each of nodes 301-306 may be scored individually by a machine learning model (for example, by one or more techniques describes herein) based on their attributes, such as, past network transactions. In some embodiments, the machine learning model may utilize more than one learning statistical model, as described herein. After scoring of each node 301-306, then, nodes that are under a certain threshold may be filtered out, such that only nodes remain that are more likely to be associated with potentially malicious behavior. For example, node 301 may have a score of 0.41, node 302 may have a score of 0.02, node 303 may have a score of 0.001, node 304 may have a score of 0.72, node 305 may have score of 0.009 and node 306 may have a score of 0.041. In such an example, the threshold may be 0.30. As a result, node 301 and node 304 may remain for further processing. In some embodiments, one or more notes that exceed the first threshold may be removed from the visual representation. In such embodiments, node 301 and node 304 may be removed from the visual representation.

Figure 4:
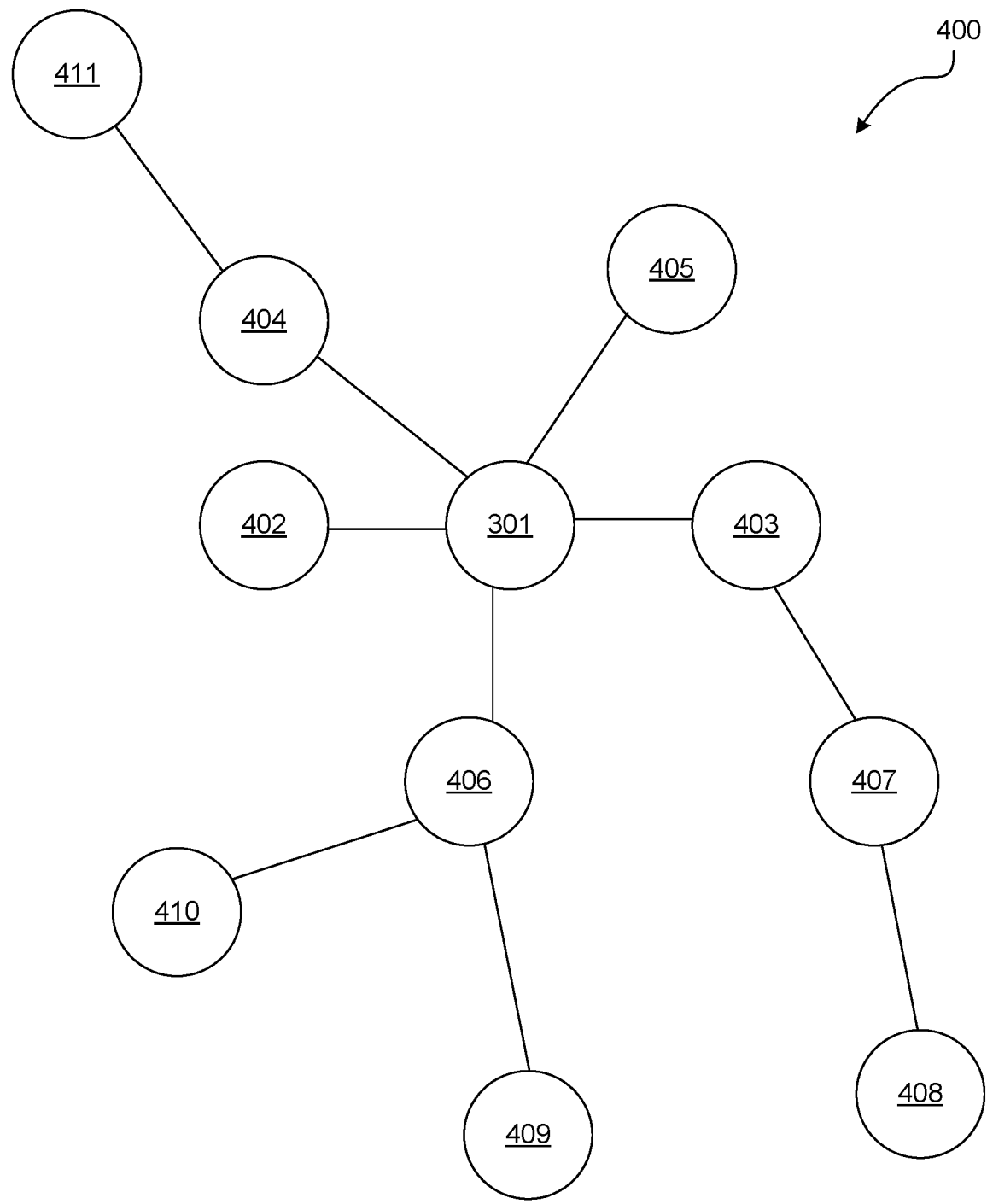
FIG. 4 provides a second visual representation based on the first visual representation.

FIG. 4 illustrates graph 400. Graph 400 is illustrated with respect to node 301, as node 301 was over the threshold. Because both node 301 and node 304 were over the threshold a similar graph may be utilized for node 304. However, for sake of explanation, graph 400 only illustrates node 301. Graph 400 represents nodes 402-411 that are related to node 301. Related nodes may be derivate entities of node 301. The network-based authentication system may retrieve one or more entities within two or three relationships from node 301. For example, node 301 may represent person A. Person A may previously have sent a network transaction to Person B (identified by node 403). Person B may have subsequently sent a network transaction to Person C (identified by node 407). Person C may have then sent a network transaction to Person D (identified by node 408). As a result, Person B is a single relationship from node 301, Person C is two relationships from node 301, and Person D is three relationships from node 301. Once neighbors (e.g., nodes within two or three relationships of node 301) are identified, a machine learning model is used to score the neighbors.

After each neighboring node has its own score calculated, the scores of all of the nodes are updated based on their respective centrality to the graph, their connections, their risk scores, and their relationship to a topology database. As a result of this determination, each of nodes 301, 402-411 may have a first individual score, then a second updated score based on for example the centrality of each node. After the second updated score is determined nodes may be filtered out that are below a threshold. The resulting nodes may be indicated as being malicious and may be flagged for further action such as preventing or blocking that particular node from receiving network transactions or initiating network transactions, and the like. In one embodiment, a graph database (GDB) may be utilized for implementing one or more aspects of this disclosure. A GDB may utilize graph structures (e.g. graph 200 and graph 400) for semantic queries with nodes, edges, and properties to represent and store data.

Figure 5:
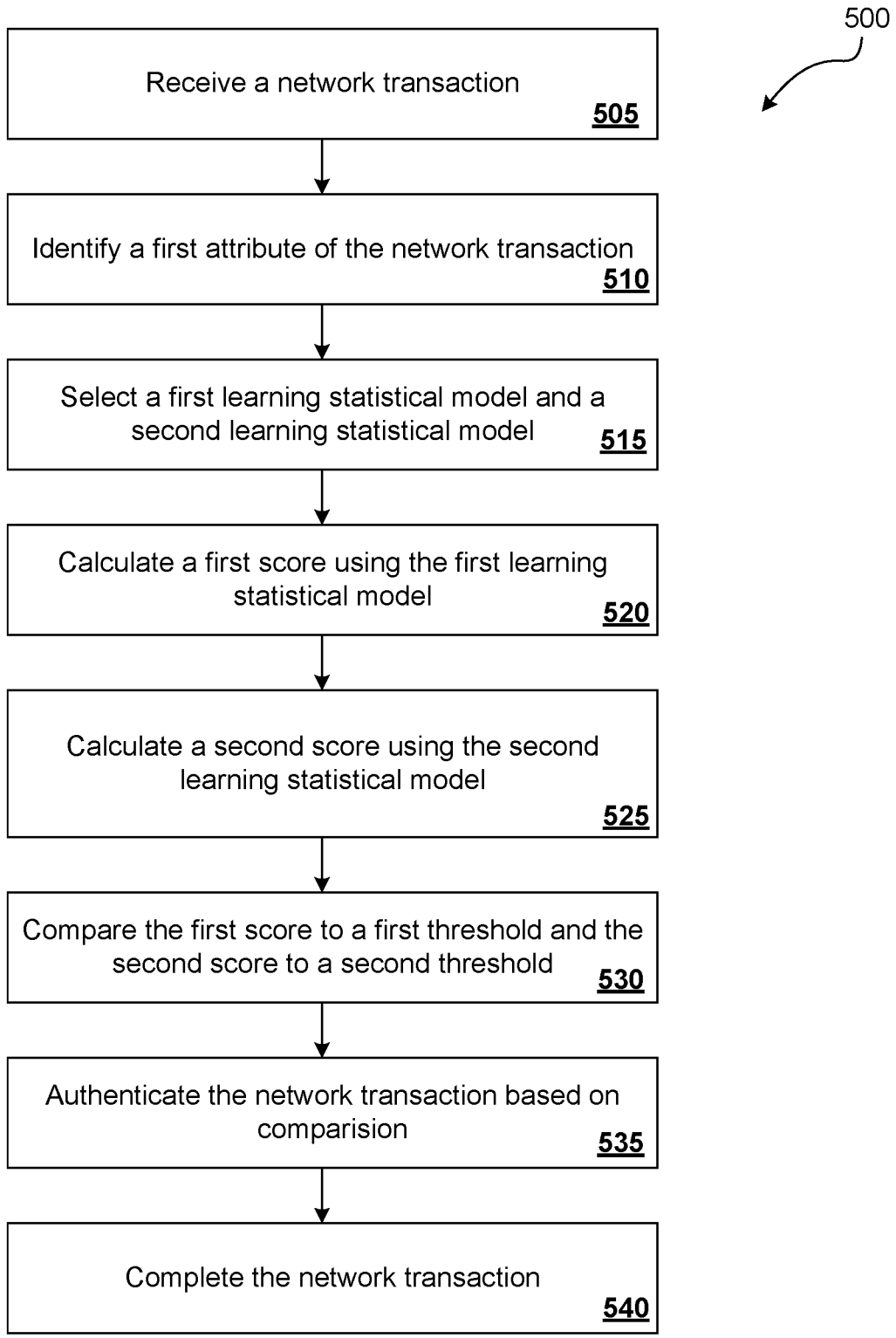
FIG. 5 illustrates a process for detecting malicious activity within a network.

FIG. 5 illustrates process 500 which may be implemented by a network-based authentication system, such as network-based authentication system 100. At step 505, the network-based authentication system may receive a network transaction. The network transaction may be received via the Internet or another type of digital interface. In one embodiment, the network transaction may be received directly from a sender device such as a mobile phone or desktop computer associated with a sender. In another embodiment, the network transaction may be received indirectly from a sender device. In such an embodiment, the network transaction may be first received by a system administrator at a system administrator location and the system administrator may then transmit the network transaction to the network-based authentication system.

At step 510, the network-based authentication system may identify a first attribute of the network transaction. An attribute of the network transaction may include an identification of sender or receiver of the current network transaction, identification of an system administrator assisting a sender or receiver of the current network transaction, a location that is the source or destination of the network transaction, a GPS-based location associated with a the current network transaction, and the like.

At step 515, the network-based authentication system may select a first learning statistical model and a second learning statistical model. For example, the network-based authentication system may select a first learning statistical model based on a first attribute and select a second learning statistical model based on a second attribute. The first learning statistical model may be different than the second learning statistical model, for example in the algorithm that it uses or it may focus on a different attribute than the second learning statistical model. In some embodiments, the network-based authentication system may select more than a first and a second learning statistical model. After selecting the first learning statistical model and the second learning statistical model, at step 520, the network-based authentication system may calculate a first score for the network transaction using the first learning statistical model. At step 525, the network-based authentication system may calculate a second score for the network transaction using the second learning statistical model.

The first and second scores may be calculated via a variety of means. In one embodiment, the first score may be calculated based on past network transactions. In such embodiments, the network-based authentication system may determine a validity period for the first attribute. Based on the validity period, past network transactions including the first attribute may be identified. The past network transactions may fall within the validity period. The past network transactions may be retrieved by the first learning statistical models. Then, the first learning statistical model may calculate a past score based on the past network transactions. The past score may include or indicate a likelihood that the past network transactions were authentic and/or not malicious. Using the past score, the first learning statistical model may calculate the first score based on the past score.

In one embodiment, the first score may be modified based on additional attributes of the network transaction. The network-based authentication system may determine an additional attribute corresponding to the network transaction. The additional attribute may different than the first attribute. For example, the additional attribute may be a country corresponding to the network transaction, while the first attribute may be another attribute such as a sender, recipient or a system administrator. The network-based authentication system may modify the first score based on the country to generate a modified first score. For example, if the country corresponding to the network transaction is known for malicious activity, then the modified first score may be higher than the first score. The modified first score may be determined based on the degree of malicious activity associated with the country. Past network transactions may be used to determine the modified first score.

After modifying the first score to generate the modified first score, the network-based authentication system may average the modified first score with the first score to generate an averaged first score. The averaged first score may then be compared with the first threshold. A similar modification process may be performed with respect to the second score, and other additional scores (e.g., third, fourth, etc.).

At step 530, the first score may be compared to a first threshold to determine whether the first score exceeds the first threshold. Such a determination may be made based on one or more processes previously described. For example, a first score exceeding a first threshold may be associated with a system administrator that has a score above a threshold, which indicates the system administrator conducted malicious behavior associated with the current network transaction or past network transactions. In such an example, once a system administrator has been identified as possibly being malicious, all of his or her network transactions may be determined to be malicious and further reviewed. In another example, a first score exceeding a first threshold may be determined based on a plurality of attributes of the network transaction and validity periods associated with the plurality of attributes.

The second score may also be compared to the second threshold at step 530. Similarly, the comparison of the second score to the second threshold may determine whether the second score exceeds the second threshold, as described herein. If the second score exceeds the second threshold, the network transaction may be flagged for further review or for remedial action.

If the first score and the second score do not exceed the first threshold and the second threshold, respectively, the network-based authentication system may determine that the network transaction is minimally or not malicious. At step 535, the network-based authentication system may authenticate the network transaction based on the comparison of the first and second scores to the first and second thresholds, respectively. In some embodiments, one or more scores may exceed the threshold, however, upon further analysis the network-based authentication system may determine that the network transaction is not malicious and authenticate the network transaction. For example, if the first score is based on a system administrator location and exceeds the first threshold, upon review the network-transaction system may identify that previous issues with the system administrator location have been resolved. As such, network transaction associated with the system administration location moving forward do not pose as high of a threat of malicious activity as historically indicated by past network transactions.

After the network-based authentication system authenticates the network transaction, the network transaction may be completed at step 540. For example, after authentication, the network transaction may be delivered to the recipient.

Figure 6:
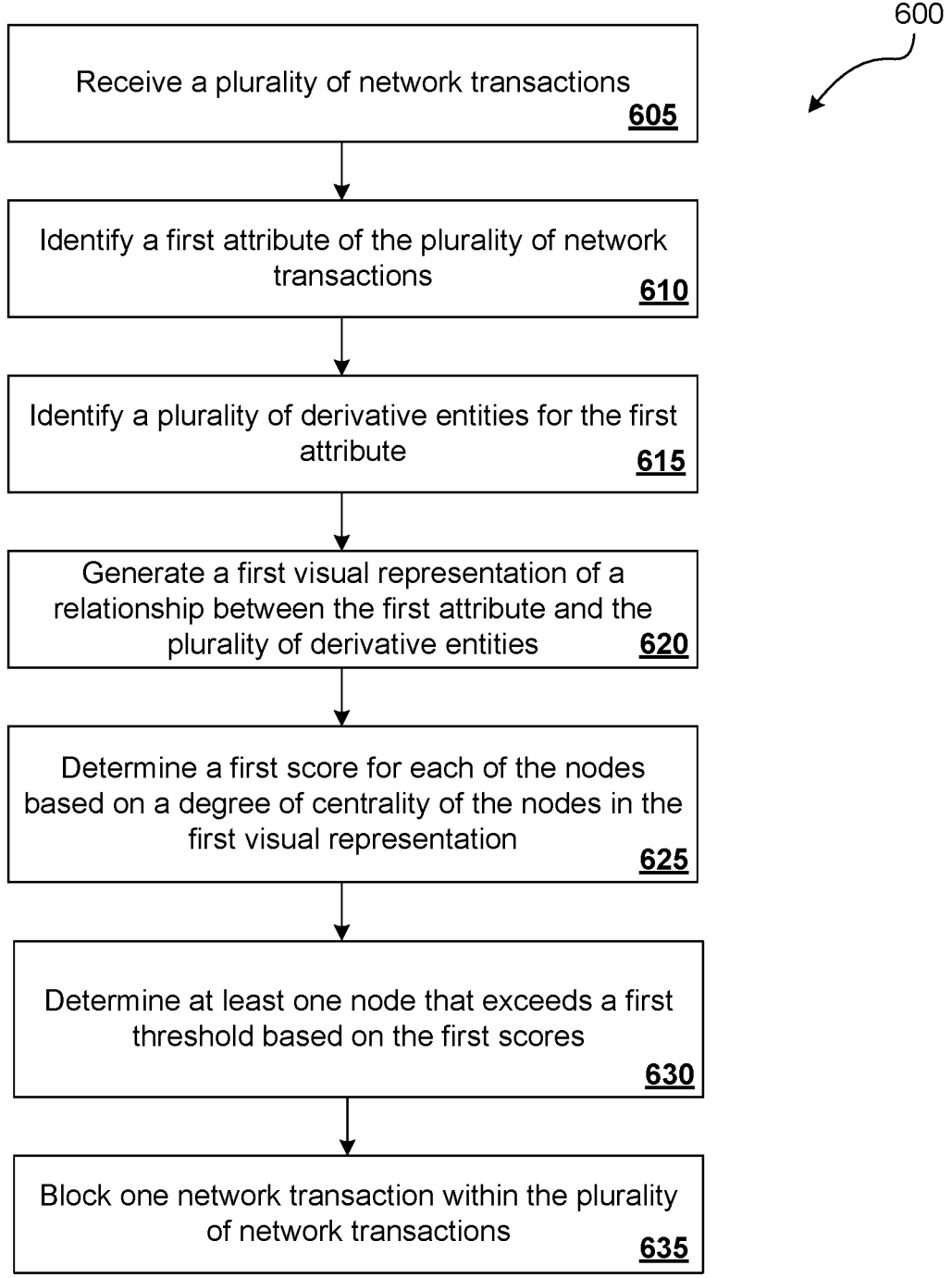
FIG. 6 illustrates a process for determining a malicious derivative entity within a network.

FIG. 6 illustrates another process 600 which may be implemented by a network-based authentication system, such as network-based authentication system 100. Process 600 may be implemented as part of process 500 or may be implemented separately from process 500. At step 605, the network-based authentication system may receive a plurality of network transactions. After receiving the plurality of network transactions, at step 610, the network-based authentication system may identify a first attribute of the plurality of network transactions. The first attribute may be common among the plurality of network transactions (e.g., each of the network transactions may share a common attribute, for example, all have the same sender). In other embodiments, the network-based authentication system may identify a first attribute for each of the plurality of network transactions, regardless if the first attribute is shared among the plurality of network transactions. In such an example, the first attribute may be different for each of the plurality of network transactions.

At step 615, the network-based authentication system may identify a plurality of derivative entities associated with the first attribute. Depending upon the selection of the first attribute, different derivate entities may be retrieved. For example, if the first attribute is a location, then the derivate entities may be a plurality of entities that have sent or received network transactions to or from the location. In another example, if the first attribute is a system administrator, then the derivate entities may be a plurality of network transactions, senders the plurality of network transactions, and/or receiver of the plurality of network transactions that were associated with the system administrator. In another example, if the first attribute is a receiver of the network transaction, then the derivate entities may be a plurality of entities that have sent and/or received network transactions with the receiver over the last 12 months.

In one embodiment, step 615 may further include determining a first entity that has at least one relation to the first attribute and determining a second entity that has at least one relation to the first entity. The plurality of entities identified at step 615 may include the first entity and the second entity.

At step 620, the network-based authentication system may generate a first visual representation of relationships between the first attribute and the plurality of derivative entities. For example, the network-based authentication system may generate a first visual representation similar to graph 400 in FIG. 4. The first visual representation may illustrate relationships between the first attribute and the plurality of derivative entities.

At step 625, the network-based authentication system may determine a first score for each of the nodes within the first visual representation. The first score may be calculated by various means such as centrality of a node. For example, the network-based authentication system may calculate a degree of centrality for each of the nodes in the first visual representation. In one embodiment, each of the first attribute and the plurality of derivative entities are represented as nodes within a graph (e.g., visual representation). The centrality for each node may be calculated. In one embodiment, a degree of centrality may refer to the number of edges or connections attached to the node. Centrality may be determined by other methods in order to determine the most important nodes within the graph. As a result, nodes that are more central may be more likely to have a higher first score. A second score may be determined by a node's respective centrality to the graph, their connections, their risk scores, and their relationship to a topology database.

At step 630, the network-based authentication system may determine at least one node that exceeds a first threshold based on the first scores. The first score for each of the nodes in the visual representation may be compared to the first threshold to determine if that node exceeds the first threshold. A node exceeding the first threshold may not be the node that represents the first attribute or any attribute of the network transaction. In such an instance, a malicious derivative entity may be identified based on the network transaction being likely associated with malicious or unauthorized entity (e.g., by exceeding first threshold). Thus, network-based authentication system may effectively determine potentially previously undetected malicious activity based on network transactions.

Based on the identification of at least one node that exceeds the first threshold, the network-based authentication system may take remedial action against the first node and/or the network transaction. Exceeding the first threshold may indicate that a particular node is malicious and remedial action may need to be taken. For example, if the first node is an entity (e.g., sender, receiver, system administrator) then that entity may be prevented from participating (e.g., sending, receiving, or assisting) in future network transactions of the network-based authentication system. In another example, if the first node is a network transaction the network transaction may be revoked, or blocked. In some cases, if the first node is directly associated with one of the network transactions in the plurality of transactions (e.g., a sender of one of the network transactions), the network-based authentication system may block that network transaction. Depending on the number of nodes exceeding the first threshold, the network-based authentication system may block more than one of the network transactions in the plurality of network transactions.

In the above description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration". Any embodiment or design described herein as "exemplary" is not necessarily to be construed as preferred or advantageous over other embodiments or designs.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, models, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for determining a malicious derivative entity within a network, the method comprising:
   receiving, by a network-based authentication system, a plurality of network transactions;
   identifying, by the network-based authentication system, a first attribute of a network transaction within the plurality of network transactions, wherein the first attribute can be one or more of: a sender identifier, a receiver identifier, a system administrator identifier, a location, a value of the network transaction, a type of the network transaction, a source, a destination or a past network transaction;
   identifying, by the network-based authentication system, a plurality of derivative entities for the first attribute;
   generating, by the network-based authentication system, a first visual representation of a relationship between the first attribute and the plurality of derivate entities, wherein each derivative entity of the plurality of derivative entities and the first attribute are represented as nodes within the first visual representation;
   determining, by the network-based authentication system, a first score for each of the nodes within the first visual representation based on a degree of centrality of the nodes within the first visual representation;
   determining, by the network-based authentication system, at least one node that exceeds a first threshold based on the first scores, wherein the at least one node is representative of one derivative entity of the plurality of derivative entities; and blocking, by the network-based authentication system, one network transaction within the plurality of network transactions based on the at least one node that exceeds the first threshold.

2. The method for determining a malicious derivative entity within the network of claim 1, further comprising:

calculating the degree of centrality for each of the nodes within the first visual representation, wherein the degree of centrality corresponds to a number of edges attached to each node.

3. The method for determining a malicious derivative entity within the network of claim 1, further comprising:

blocking, by the network-based authentication system, an entity from participating in future network transactions of the network-based authentication system based on the at least one node exceeding the first threshold.

4. The method for determining a malicious derivative entity within the network of claim 1, further comprising:

determining, by the network-based authentication system, a machine learning model;

determining, by the machine learning model, a first individual score for each of the nodes within the first visual representation; and updating, by the network-based authentication system, the first score for each of the nodes within the first visual representation to generate a second updated score for each of the nodes.

5. The method for determining a malicious derivative entity within the network of claim 4, wherein updating the first score for each of the nodes within the first visual representation further comprises:

comparing, by the network-based authentication system, the first individual score for each of the nodes to a threshold; and removing, by the network-based authentication system, one or more nodes that have first individual scores that exceed the threshold from the first visual representation.

6. The method for determining a malicious derivative entity within the network of claim 1, wherein identifying, by the network-based authentication system, the plurality of derivative entities for the first attribute further comprises:

determining, by the network-based authentication system, a first entity that has at least one relation to the first attribute; and determining, by the network-based authentication system, a second entity that has at least one relation to the first entity, wherein the plurality of derivative entities comprises the first entity and the second entity.

7. A network-based authentication system comprising: one or more processing units, each processing unit comprising one or more processors; and one or more memory devices respectively coupled to and readable by the one or more processing units, the memory devices storing therein instructions which, when executed by the processing units, causes one or more processors to:

receive a plurality of network transactions;

identify a first attribute of a network transaction within the plurality of network transactions, wherein the first attribute can be one or more of: a sender identifier, a receiver identifier, a system administrator identifier, a location, a value of the network transaction, a type of the network transaction, a source, a destination or a past network transaction;

identify a plurality of derivative entities for the first attribute;

generate a first visual representation of a relationship between the first attribute and the plurality of derivate entities, wherein each derivative entity of the plurality of derivative entities and the first attribute are represented as nodes within the first visual representation;

determine a first score for each of the nodes within the first visual representation based on a degree of centrality of the nodes within the first visual representation;

determine at least one node that exceeds a first threshold based on the first scores, wherein the at least one node is representative of one derivative entity of the plurality of derivative entities; and block one network transaction within the plurality of network transactions based on the at least one node that exceeds the first threshold.

8. The network-based authentication system of claim 7, wherein the instructions, when executed by the one or more processors, further cause the one or more processors to:

calculate the degree of centrality for each of the nodes within the first visual representation, wherein the degree of centrality corresponds to a number of edges attached to each node.

9. The network-based authentication system of claim 7, wherein the instructions, when executed by the one or more processors, further cause the one or more processors to:

take remedial action against the at least one node that exceeds the first threshold, wherein the at least one node is an entity and the remedial action comprises blocking the entity from participating in future network transactions within the network-based authentication system.

10. The network-based authentication system of claim 7, wherein the instructions, when executed by the one or more processors, further cause the one or more processors to:

determine a machine learning model; determine, by the machine learning model, a first individual score for each of the nodes within the first visual representation; and update the first score for each of the nodes within the first visual representation to generate a second updated score for each of the nodes.

11. The network-based authentication system of claim 10, wherein the instructions, when executed by the one or more processors, further cause the one or more processors to:

compare the first individual score for each of the nodes to a threshold; and remove one or more nodes that have first individual scores that exceed the threshold from the first visual representation.

12. The network-based authentication system of claim 7, wherein the instructions, when executed by the one or more processors, further cause the one or more processors to:

determine a first entity that has at least one relation to the first attribute; and determine a second entity that has at least one relation to the first entity, wherein the plurality of derivative entities comprises the first entity and the second entity.

13. A non-transitory, computer-readable medium having stored thereon instructions which, when executed by one or more processors of a network-based authentication system, cause the one or more processors to determine a malicious derivative entity within a network by:

receiving a plurality of network transactions;

identifying a first attribute of a network transaction within the plurality of network transactions, wherein the first attribute can be one or more of: a sender identifier, a receiver identifier, a system administrator identifier, a location, a value of the network transaction, a type of the network transaction, a source, a destination or a past network transaction;

identifying a plurality of derivative entities for the first attribute;

generating a first visual representation of a relationship between the first attribute and the plurality of derivate entities, wherein each derivative entity of the plurality of derivative entities and the first attribute are represented as nodes within the first visual representation;

determining a first score for each of the nodes within the first visual representation based on a degree of centrality of the nodes within the first visual representation;

determining at least one node that exceeds a first threshold based on the first scores, wherein the at least one node is representative of one derivative entity of the plurality of derivative entities; and blocking one network transaction within the plurality of network transactions based on the at least one node that exceeds the first threshold.

14. The non-transitory, computer-readable medium of claim 13, further comprising instructions which, when executed by the one or more processors of the network-based authentication system, cause the one or more processors to determine the malicious derivative entity within the network by:

calculating the degree of centrality for each of the nodes within the first visual representation, wherein the degree of centrality corresponds to a number of edges attached to each node.

15. The non-transitory, computer-readable medium of claim 13, further comprising instructions which, when executed by the one or more processors of the network-based authentication system, cause the one or more processors to determine the malicious derivative entity within the network by:

taking remedial action against the at least one node that exceeds the first threshold, wherein the at least one node is an entity and the remedial action comprises blocking the entity from participating in future network transactions within the network-based authentication system.

16. The non-transitory, computer-readable medium of claim 13, further comprising instructions which, when executed by the one or more processors of the network-based authentication system, cause the one or more processors to determine the malicious derivative entity within the network by:

determining a machine learning model; determining, by the machine learning model, a first individual score for each of the nodes within the first visual representation; and updating the first score for each of the nodes within the first visual representation to generate a second updated score for each of the nodes.

17. The non-transitory, computer-readable medium of claim 16, further comprising instructions which, when executed by the one or more processors of the network-based authentication system, cause the one or more processors to determine the malicious derivative entity within the network by:

comparing the first individual score for each of the nodes to a threshold; and removing one or more nodes that have first individual scores that exceed the threshold from the first visual representation.

18. The non-transitory, computer-readable medium of claim 13, further comprising instructions which, when executed by the one or more processors of the network-based authentication system, cause the one or more processors to determine the malicious derivative entity within the network by:

determining a first entity that has at least one relation to the first attribute; and determining a second entity that has at least one relation to the first entity, wherein the plurality of derivative entities comprises the first entity and the second entity.

* * * * *